US00RE41934E

(19) United States
(12) Reissued Patent
Maruta et al.

(10) Patent Number: US RE41,934 E
(45) Date of Reissued Patent: Nov. 16, 2010

(54) IMAGE FORMING SYSTEM

(75) Inventors: Takayuki Maruta, Tokyo (JP); Takahiro Yamazaki, Tokyo (JP)

(73) Assignee: Ricoh Company, Ltd., Tokyo (JP)

(21) Appl. No.: 11/083,329

(22) Filed: Mar. 18, 2005

Related U.S. Patent Documents

Reissue of:
(64) Patent No.: 6,535,707
Issued: Mar. 18, 2003
Appl. No.: 09/985,000
Filed: Nov. 1, 2001

(30) Foreign Application Priority Data

Nov. 1, 2000 (JP) ..... 2000-335153

(51) Int. Cl.
*G03G 15/01* (2006.01)

(52) U.S. Cl. ..... 399/227; 399/302; 399/308
(58) Field of Classification Search ..... 399/222, 399/223, 225, 226, 227, 302, 308
See application file for complete search history.

(56) References Cited

U.S. PATENT DOCUMENTS

| | | | | | |
|---|---|---|---|---|---|
| 4,772,916 | A | | 9/1988 | Mochida | |
| 4,916,547 | A | | 4/1990 | Katsumata et al. | 358/300 |
| 5,599,645 | A | * | 2/1997 | Tamiya et al. | 430/47.2 |
| 5,640,654 | A | | 6/1997 | Yoshizawa | |
| 5,671,470 | A | | 9/1997 | Maruta et al. | 399/235 |
| 5,724,634 | A | | 3/1998 | Maruta | 399/227 |
| 5,826,146 | A | | 10/1998 | Maruta et al. | 399/235 |
| 5,835,825 | A | | 11/1998 | Maruta | 399/227 |
| 5,970,278 | A | | 10/1999 | Munakata | 399/46 |
| 6,070,037 | A | | 5/2000 | Sugihara et al. | 399/274 |
| 6,070,047 | A | * | 5/2000 | Ichinose et al. | 399/350 |
| 6,160,569 | A | | 12/2000 | Fujimori et al. | |
| 6,226,481 | B1 | | 5/2001 | Yoneda et al. | |
| 6,243,550 | B1 | * | 6/2001 | Fuchiwaki et al. | 399/94 |
| 6,256,459 | B1 | | 7/2001 | Hasegawa et al. | 399/27 |
| 6,308,019 | B1 | * | 10/2001 | Miyashiro et al. | 399/66 |
| 6,397,027 | B2 | * | 5/2002 | Katakabe et al. | 399/113 |
| 7,092,660 | B2 | * | 8/2006 | Tanaka et al. | 399/227 |
| 7,197,255 | B2 | * | 3/2007 | Yamada | 399/51 |
| 7,200,353 | B2 | * | 4/2007 | Kitazawa et al. | 399/302 |

FOREIGN PATENT DOCUMENTS

| | | |
|---|---|---|
| JP | 63-23173 | 1/1988 |
| JP | 8-171253 | 7/1996 |
| JP | 2000-172049 | 6/2000 |
| JP | 2000-242099 | 9/2000 |

* cited by examiner

*Primary Examiner*—Hoan Tran
(74) *Attorney, Agent, or Firm*—Oblon, Spivak, McClelland, Maier & Neustadt, L.L.P.

(57) ABSTRACT

An image forming system is disclosed which can prevent toner stain adhered onto an image bearing member at the time of switching from one developing unit to another from adhering to an image area on an intermediate transfer member and which can thereby prevent the deterioration of image quality. Latent images formed on a photoreceptor drum are developed by developing units in a revolver developing unit, toner images thus formed are primarily transferred in an overlapped state onto an intermediate transfer belt in a primary transfer section, and the thus primarily transferred toner images are together transferred secondarily onto a transfer paper. In this image forming system, a revolving operation of the revolver developing unit is controlled so that an area on the photoreceptor drum with which a developer contained in a Bk developing unit comes into contact upon 22.5° revolution of the revolver developing unit from a home position with consequent movement of the Bk developing unit to a developing position contacts a not-to-be-transferred area on the intermediate transfer belt in the primary transfer section. By so doing, toner stain caused by the Bk developing unit which has moved to the developing position does not exert any influence on the toner images formed on the intermediate transfer belt.

12 Claims, 10 Drawing Sheets

FIG.1A DRIVE TIMING
FIG.1B MARK DETECTION TIMING
FIG.1C F GATE SIGNAL TIMING
FIG.1D REVOLVER DRIVE TIMING
FIG.1E IMAGE AREA
BK
Y
C
M
22.5°
90°
90°
90°
67.5°
BK TONER STAIN
Y TONER STAIN
C TONER STAIN
M TONER STAIN
IMAGE AREA
NON-IMAGE AREA

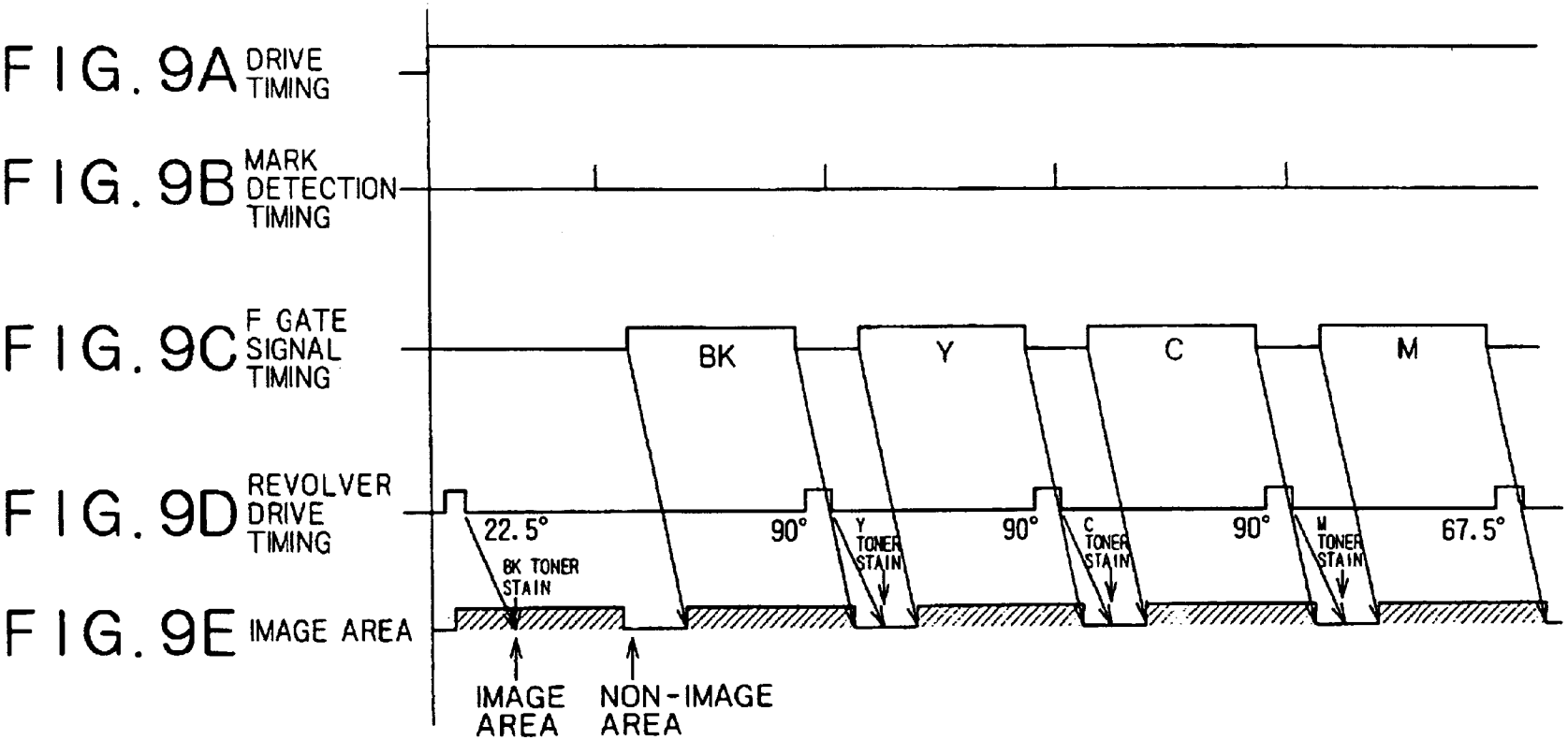
FIG. 9A DRIVE TIMING
FIG. 9B MARK DETECTION TIMING
FIG. 9C F GATE SIGNAL TIMING
FIG. 9D REVOLVER DRIVE TIMING
FIG. 9E IMAGE AREA
BK
Y
C
M
90°
90°
90°
67.5°
22.5°
BK TONER STAIN
Y TONER STAIN
C TONER STAIN
M TONER STAIN
IMAGE AREA
NON-IMAGE AREA

IMAGE FORMING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image forming system such as a copying machine, a facsimile, or a printer and more particularly to an image forming system wherein an image bearing member and an intermediate transfer member are kept in contact with each other, toner images formed on the image bearing member are primarily transferred onto the intermediate transfer member, and the toner images thus primarily transferred onto the intermediate transfer member are together transferred secondarily onto a transfer medium.

2. Description of the Prior Art

Heretofore, as this type of an image forming system, there is known an image forming system wherein toner images formed on a photoreceptor as an image bearing member are primarily transferred onto an intermediate transfer member by utilizing an electrostatic force and thereafter the toner images on the intermediate transfer member are secondarily transferred onto a transfer paper by utilizing an electrostatic force. The image forming system using such an intermediate transfer member is advantageous in that images can be formed on various kinds of transfer papers, including plain paper and cardboard.

Among image forming systems having an intermediate transfer member, there is known one which is constructed so as to perform image formation in a constantly contacted state of the intermediate transfer member with a photoreceptor. This image forming system does not require the provision of an engaging/disengaging mechanism for the engagement and disengagement of the intermediate transfer medium with respect to the photoreceptor. Thus, the image forming system in question is advantageous in that the components' cost can be reduced by an amount corresponding to the disengaging mechanism and hence space-saving can so much be attained in comparison with an image forming system which has a construction permitting engagement and disengagement of the intermediate transfer member with and from the photoreceptor.

Moreover, in the image forming system having an intermediate transfer member, toner images formed on a photoreceptor can be overlapped onto the intermediate transfer member, thus permitting the image forming system to be widely used as a color image forming system capable of forming a color image on a transfer paper. In the color image forming system there is used a developing apparatus having plural developing units capable of effecting development using different colors of developers, and latent images are developed by corresponding developing units respectively. In such an image forming system, when latent images formed successively on a single photoreceptor are developed by corresponding developing units respectively, there arises the necessity of switching from one to another developing unit in a successive manner. In connection with this developing unit switching operation, there are known a method wherein one and same developing position is used for the developing units and the developing units themselves are moved successively for development to the developing position and a method wherein different developing positions are used for the developing units respectively and the developing units themselves do not move. As examples of the former method are mentioned a revolver method and a slider method. On the other hand, as an example of the latter method there is known a method wherein switching is made from one to another developing unit by bringing only the developer in the developing unit to be used into contact with a photoreceptor with use of an engaging/disengaging mechanism provided in each developing unit.

In a developing apparatus adopting a revolver method or a slide method wherein developing units themselves are moved to a developing position, the developing units are generally arranged so that they can move to the developing position successively in accordance with a development order adopted in forming a full-color image in which image formation is performed using all the developing units. For example, in a revolver developing apparatus adopting a revolver method wherein development is performed in the order of black ("Bk" hereinafter), yellow ("Y"), cyan ("C"), and magenta ("M") at the time of forming a full-color image, these four-color developing units are arranged side by side in their revolving direction in the order of Bk, Y, C, and M.

In the image forming system provided with such a revolver developing apparatus, the developing unit which is the first to make development must lie in the developing position before the start of development. For moving each developing unit most efficiently at the time of forming a full-color image, the revolver developing apparatus, before the start of the image forming process, is stopped at a home position where the Bk developing unit which is the first to perform development is located nearest to an upstream side in the revolving direction of the revolver developing apparatus. From this home position the developing unit which is used in this image forming process and which is the first to make development is moved to the developing position to effect development.

However, when the image forming process is started and the developing unit which is the first to make development has moved to the developing position, the developer in the developing unit adheres onto a photoreceptor already before the start of development, causing stain of the toner present on the photoreceptor. The first reason for the occurrence of such toner stain is presumed to be as follows. When the developer pressure increases between a developer carrier in a developing unit and a photoreceptor in relation to both a development gap and a developer scoop-up quantity (developer weight per unit area), there increases an impact force between the developer carrier and the photoreceptor with movement of the developing unit, so that it becomes easier for the toner to leave the developer carrier, and the spilt toner adheres onto the photoreceptor with van der Waals' force. The second reason is presumed to be as follows. The potential of a toner layer portion deposited on the developer carrier approaches a surface potential of the photoreceptor rather than the potential of the developer carrier surface, causing an effective bias of development to be changed, with consequent deposition of toner onto the photoreceptor. The toner stain thus generated is conveyed to a primary transfer section as it is adhered to the photoreceptor and adheres onto an intermediate transfer member. If the surface portion of the intermediate transfer member thus stained with the toner stain is an area (a "to-be-transferred area" hereinafter) onto which a toner image on the photoreceptor is to be primarily transferred in this image forming process, the toner stain overlaps a toner image to be subsequently transferred primarily onto the to-be-transferred area. The resulting ground stain causes deterioration of the image quality.

In the case where image formation is to be done using the above image forming system and using, for example, only the three colors of Y, C, and M without using Bk, it is necessary that the Y developing unit which is the first to make development be moved to the developing position after start of the image forming process. In this case, it is necessary that the Y developing unit be moved to the developing position while skipping over the Bk developing unit from the home position. During this movement, the developer in the Bk developing unit comes into contact with the photoreceptor surface at the developing position. Also at the instant of this contact the toner adheres onto the photoreceptor for the same reason as above and the resulting toner stain adheres onto the intermediate transfer member. If this stained portion is the to-be-transferred area, a ground stain results and causes an image quality deterioration like above.

In the case where image formation is to be performed using the above image forming system and using, for example, only the two colors of Bk and M, it is necessary that, after the completion of development by the Bk developing unit, the M developing unit to be used next for development be moved to the developing position. In this case, if a full-color image is to be formed, it is necessary that the M developing unit be moved to the developing position while skipping over the Y developing unit to be next used for development and further skipping over the C developing unit to be used for development next to the Y developing unit. At this time, if the to-be-transferred area in the surface movement direction of the intermediate transfer member is long, a not-to-be-transferred area of the intermediate transfer member becomes very narrow. Therefore, in relation to the developing unit moving time, even if the movement of the M developing unit is started just after the completion of Bk development, there sometimes occurs a case where the M developing unit cannot be moved to the developing position before a front end of the to-be-transferred area on the intermediate transfer member reaches the primary transfer section. In this case, M toner image cannot be primarily transferred onto the intermediate transfer member, so there arises the necessity of causing the intermediate transfer member to idle-rotate and thereby causing the to-be-transferred area to again reach the primary transfer section. During this idle-rotation, since the to-be-transferred area on the intermediate transfer member is long, C and M toner stains adhere to the to-be-transferred area on the intermediate transfer member, with consequent ground stain causing the deterioration of image quality.

Reference will be made below to a concrete example of image formation performed using an image forming system and using only the two colors of Bk and M. In the image forming apparatus used, the time required for switching from one to another developing unit in a revolver developing apparatus (the time required for 90° revolution) was 320 msec and a circumferential length of an intermediate transfer belt as an intermediate transfer member was 565.5 mm.

FIGS. 10(a) to 10(d) are timing charts showing a part of a conventional sequence control operation performed when an image is formed in a longitudinal direction of Japanese Industrial Standard A3-size paper (a direction in which the longitudinal direction of the paper is positioned in parallel with a surface movement direction on an intermediate transfer belt). FIG. 10(e) is a timing chart showing at what timing a to-be-transferred area on the intermediate transfer belt passes a primary transfer section. As shown in FIG. 10(e), Y toner stain and C toner stain adhere to a not-to-be-transferred area on the intermediate transfer belt, but M toner stain adheres within the to-be-transferred area. As a result, a lateral band-like ground stain attributable to M toner stain occurred in a portion 21 mm from the image front end on the paper.

When a 12×18 in. paper image larger than the Japanese Industrial Standard A3-size paper image was formed, C and M toner stains adhered to the to-be-transferred area on the intermediate transfer member and there occurred a lateral band-like ground stain attributable to the C toner stain at a portion 24 mm from the front end portion of the image on the paper and a lateral band-like ground stain attributable to the M toner stain at a portion 63 mm from the image front end. Further, when an image in the transverse direction of a Japanese Industrial Standard A4-size paper was formed by double-sheet image formation onto an intermediate transfer belt, there occurred a lateral band-like ground stain attributable to C toner stain at a portion 13 mm from the image front end on paper corresponding to the first sheet of image on the intermediate transfer belt and there occurred a lateral band-like ground stain attributable to M toner stain at a portion 50 mm from the image front end on the paper.

SUMMARY OF THE INVENTION

The present invention has been accomplished in view of the above-mentioned background and it is an object of the invention to provide an image forming system capable of preventing a toner stain adhered onto an image bearing member from adhering to a to-be-transferred area on an intermediate transfer member.

For achieving the above-mentioned object, in a first aspect of the present invention, there is provided an image forming system comprising an image bearing member, an intermediate transfer member which is kept in contact with the image bearing member, a developing apparatus having plural developing units, the developing apparatus causing a developer contained in a predetermined one of the developing units into contact with the image bearing member to develop a latent image formed on the image bearing member, a developing unit moving means capable of moving the predetermined developing unit to a developing position where the developer in the predetermined developing unit comes into contact with the image bearing member, latent images formed on the image bearing member being developed respectively by the developing units of the developing apparatus, toner images thus formed on the image bearing member being primarily transferred onto the intermediate transfer member in a primary transfer section in which the image bearing member and the intermediate transfer member are in contact with each other, and the toner images thus primarily transferred onto the intermediate transfer member being together transferred secondarily onto a transfer medium, and a control means which controls the developing unit moving means in such a manner that an area on the image bearing member at which the developer contained in the predetermined developing unit contacts the image bearing member to effect development, comes to contact a not-to-be-transferred area on the intermediate transfer member in the primary transfer section.

The "not-to-be-transferred area" as referred to herein indicates an area on an intermediate transfer belt onto which a toner image formed on a photoreceptor is not primarily transferred.

According to this image forming system, toner stain adhered to the image bearing member can be prevented from adhering to the to-be-transferred area on the intermediate transfer member which adhesion is caused by, for example, an impart force induced upon movement of the developing unit to effect development to the developing position.

In second to sixth aspects of the present invention there is provided an image forming system comprising an image bearing member, an intermediate transfer member which is kept in contact with the image bearing member, a developing apparatus having plural developing units, the developing apparatus causing a developer contained in a predetermined one of the developing units into contact with the image bearing member to develop a latent image formed on the image bearing member, a developing unit moving means capable of moving the predetermined developing unit to a developing position where the developer in the predetermined developing unit comes into contact with the image bearing member, latent images formed on the image bearing member being developed respectively by the developing units of the developing apparatus, toner images formed on the image bearing member being primarily transferred onto the intermediate transfer member in a primary transfer section in which the image bearing member and the intermediate transfer member are in contact with each other, and the toner images thus primarily transferred onto the intermediate transfer member being together transferred secondarily onto a transfer medium, and a control means which, when moving one of the predetermined developing unit to effect development to the developing position so that any of the other developing units positioned on an upstream side in a developing unit moving direction of the developing position with respect to the predetermined developing unit passes the developing position, controls the developing unit moving means in such a manner that an area on the image bearing member at which a developer contained in the any of the other developing units contacts the image bearing member when the any of the other developing units passes the developing position, is an area on the image bearing member which area comes into contact with a not-to-be-transferred area on the intermediate transfer member in the primary transfer section.

According to this image forming system, when moving the developing unit to effect development to the developing position while skipping over the developing units not to effect development, a toner stain which adheres to the image bearing member when any of the developing units not to effect development passes the developing position can be prevented from adhering to the to-be-transferred area on the intermediate transfer member.

Particularly, in a third aspect of the present invention there is provided, in combination with the above second aspect, an image forming system further comprising a control switching means which switches from one method to another for controlling the developing unit moving means in accordance with image forming conditions involving different lengths of the not-to-be-transferred area in a surface movement direction of the intermediate transfer member, and wherein the control means controls the developing unit control means in accordance with the control method switched by the control switching means.

In this image forming system, even if the length of the not-to-be-transferred area in the surface movement direction of the intermediate transfer member changes according to image forming conditions in the image forming process, it is possible to let toner image adhere to the not-to-be-transferred area by switching to a control method which matches the not-to-be-transferred area In a fourth aspect of the present invention there is provided, in combination with the above third aspect, an image forming system wherein the control switching means has a storage medium which stores plural control methods corresponding respectively to the above image forming conditions and also has a control method read means for reading from the storage medium a control method corresponding to an image forming condition for an image forming process carried out by the image forming system.

According to this image forming system, an appropriate control method matching the image forming condition adopted in the image forming process concerned can be read from the storage medium which pre-stores control methods corresponding to different lengths of the not-to-be-transferred area.

In a fifth aspect of the present invention there is provided, in combination with the above second aspect, an image forming system further comprising a control switching means for switching from one control method to another to control the developing unit moving means in accordance with the type of a developing unit used in an image forming process carried out by the image forming system, and wherein the control means controls the developing unit moving means in accordance with the control method switched by the control switching means.

In this image forming system, in case of carrying out the image forming process by using any of the plural developing units in the developing apparatus, there sometimes arises the necessity of moving the developing unit used to the developing position while skipping over the developing units not used. In this case, by switching to the control method which matches the type of the developing unit used, toner stain adhered to the image bearing member can be prevented from adhering to the to-be-transferred area on the intermediate transfer member when any of the developing units not used passes the developing position.

Further, in a sixth aspect of the present invention there is provided, in combination with the above fifth aspect, an image forming system wherein the control switching means has a storage medium which stores plural control methods corresponding respectively to the types of the developing units used in the image forming process and also has a control method read means for reading the control methods corresponding to the types of the developing units from the storage medium.

According to this image forming system, an appropriate control method matching the image forming condition adopted in the image forming process concerned can be read from the storage medium which pre-stores control methods corresponding to the types of the developing units used.

BRIEF DESCRIPTION OF THE DRAWINGS

FIGS. 9(a) to 9(d) are timing charts showing a control method adopted in case of toner stain adhering to the to-be-transferred area on the intermediate transfer belt, for comparison with Control Example 1;

FIG. 9(e) is a timing chart showing at what timing the to-be-transferred area on the intermediate transfer belt passes the primary transfer section, in a corresponding relation to the timing charts of FIGS. 9(a) to 9(d);

DETAILED DESCRIPTION OF A PREFERRED EMBODIMENT

An embodiment of the present invention will be described hereinunder in which the invention is applied to an electrophotographic copying machine (hereinafter referred to simply as "copying machine") as an image forming system.

Reference will first be made to an entire construction of the copying machine of the embodiment.

Figure 2:
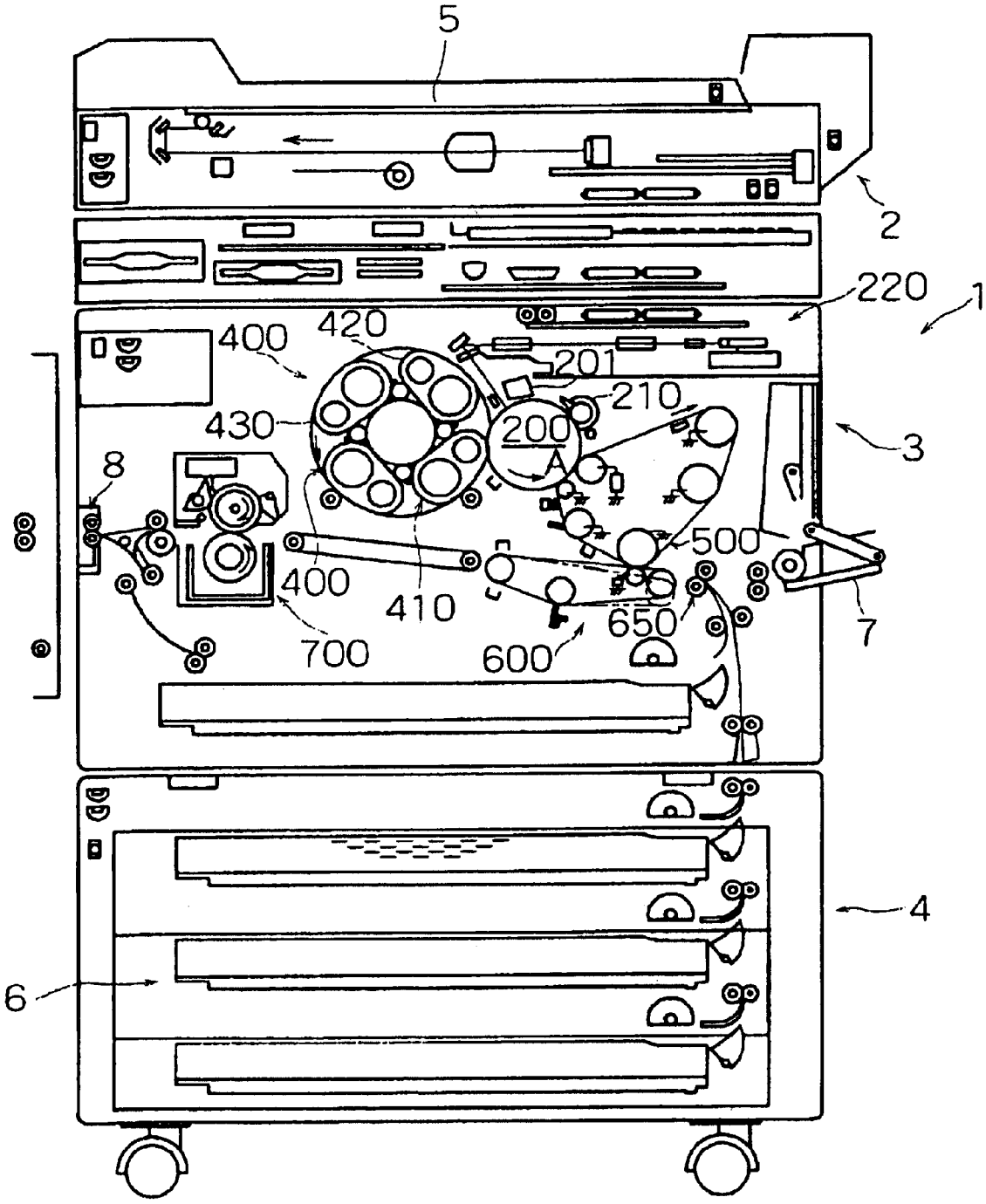
FIG. 2 is a schematic construction diagram of an entire copying machine embodying the present invention.
Figure 3:
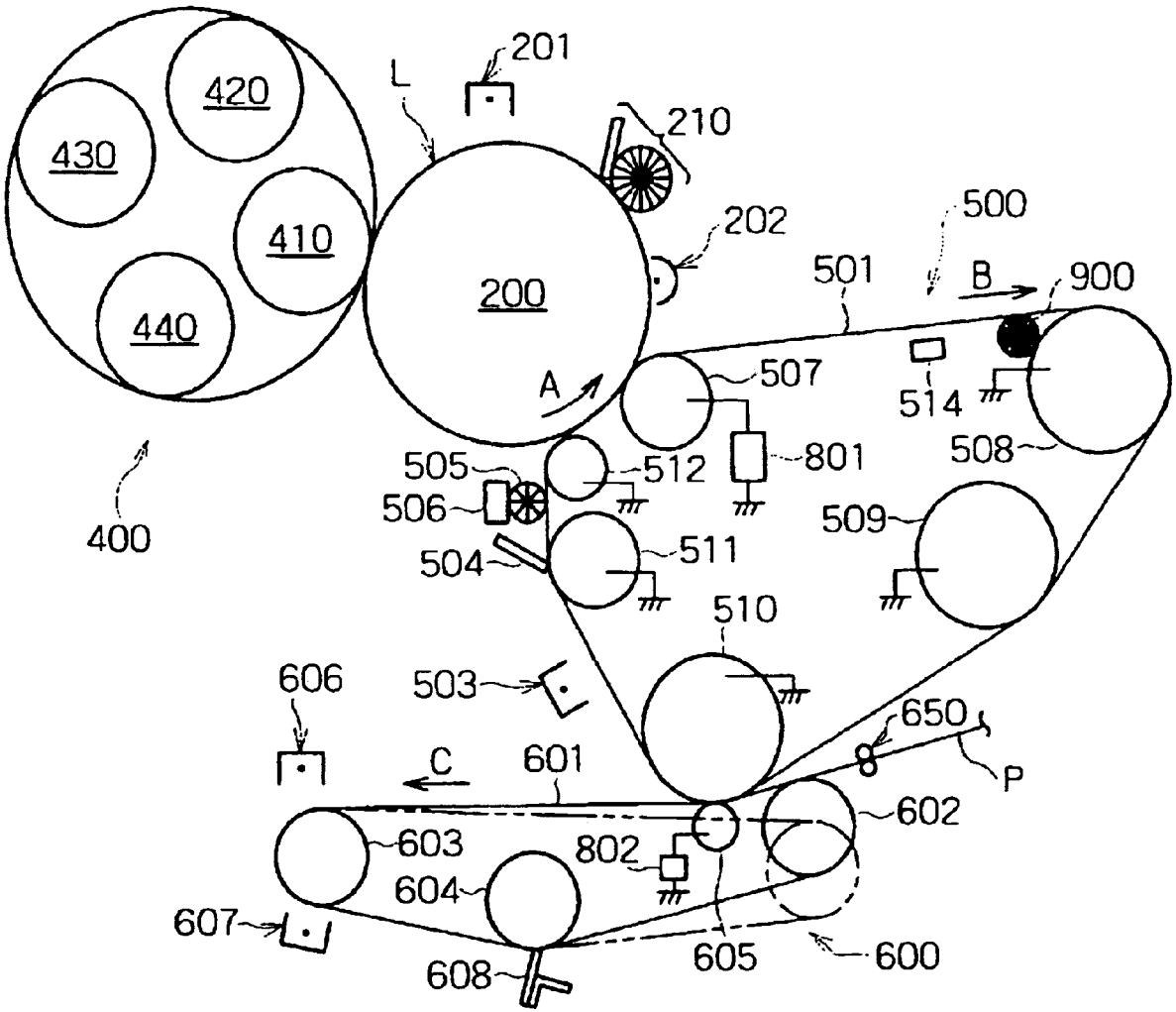
FIG. 3 is a schematic construction diagram of an image forming section as a principal section of the copying machine.
Figure 4:
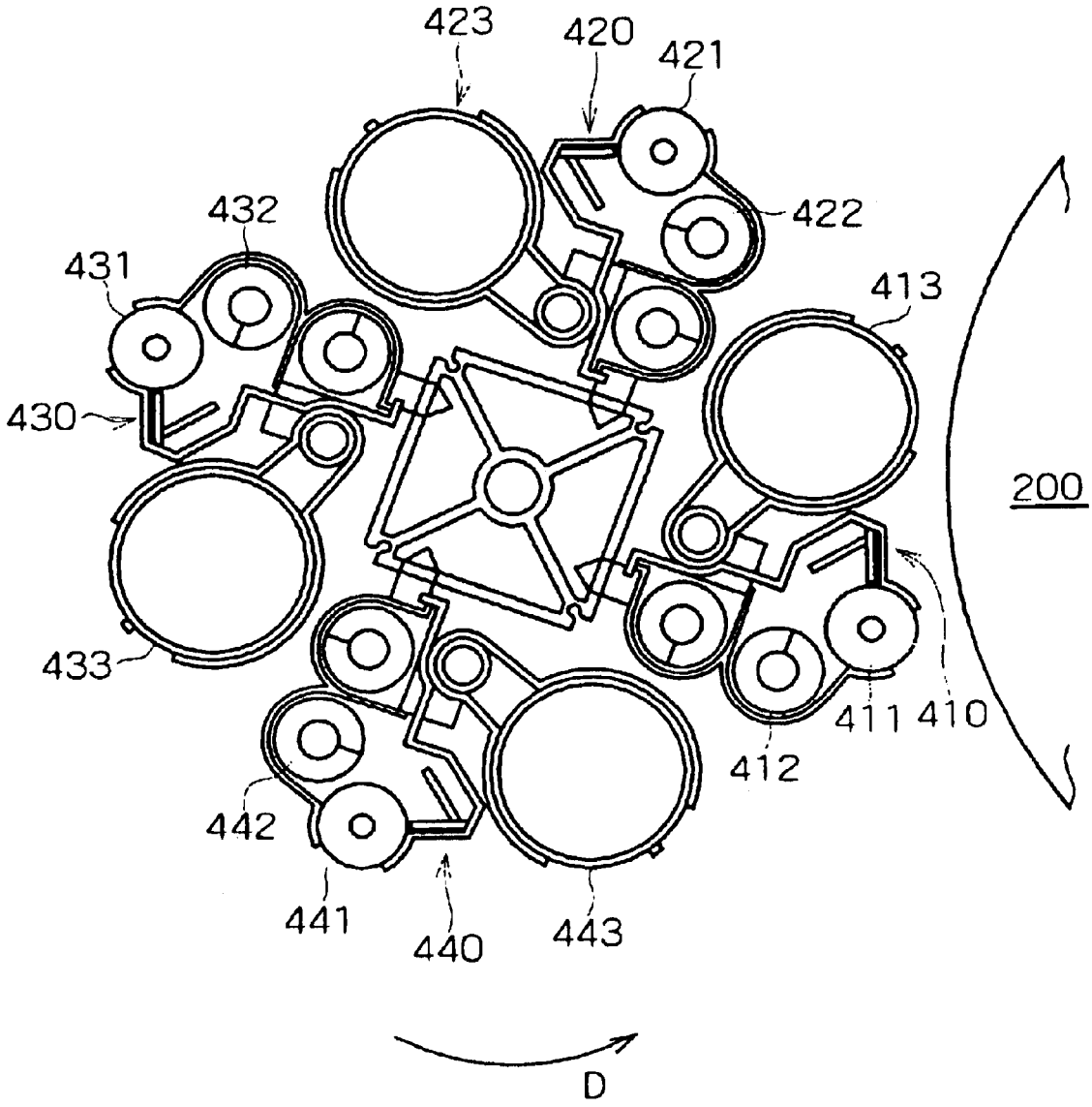
FIG. 4 is a schematic construction diagram of a revolver developing apparatus used in the copying machine.

FIG. 2 is a schematic construction diagram of the entire copying machine of the embodiment, FIG. 3 is a schematic construction diagram of an image forming section as a principal section of the copying machine, and FIG. 4 is a schematic construction diagram of a revolver developing apparatus used in the copying machine. The copying machine, indicated at 1, is mainly composed of an image read section ("scanner section" hereinafter) 2, an image forming section ("printer section" hereinafter) 3 shown in FIG. 3, and a paper feed cassette section 4.

The scanner section 2 reads color image information on an original 5 for each of color separation lights of, for example, red, green, and blue ("R," "G," "B," respectively) and converts the thus-read color image information pieces into electrical image signals. Then, on the basis of intensity levels of these R, G, B color separation image signals, a color conversion processing is performed in an image processing section (not shown) to afford image data of Bk, Y, C, and M. The image data thus obtained are sent to the printer section 3.

The printer section 3 comprises a photoreceptor drum 200 as an image bearing member, a charger 201 as a charging means, a destaticizer 202 as a photoreceptor destaticizing means, a photoreceptor cleaner 210 consisting of a cleaning blade and a fur brush, an optical write unit 220 as a latent image forming means, a revolver developing unit 400 as a developing apparatus, an intermediate transfer unit 500, a secondary transfer unit 600 as a secondary transfer means, and a fixing unit 700 as a fixing means using a pair of fixing rollers 701. The photoreceptor drum 200 rotates counterclockwise as indicated with arrow A in FIG. 3. Around the photoreceptor drum 200 are arranged the charger 201, the photoreceptor cleaner 210, a developing unit selected from among developing units in the revolver developing unit 400, and the intermediate transfer unit 500.

The optical write unit 220 converts image data provided from the scanner section 2 into an optical signal and radiates laser beam L corresponding to an image on the original to the surface of the photoreceptor drum 200 which is charged uniformly by the charger 201, to effect an optical write and form an electrostatic latent image on the surface of the photoreceptor drum. The optical write unit 220 may be composed of a semiconductor laser as a light source, a laser emission drive controller, a polygon mirror, a motor for rotating the polygon mirror, an f/θ lens, and a reflecting mirror.

As shown in FIG. 4, the revolver developing unit 400 comprises a Bk developing unit 410 which uses Bk toner, a Y developing unit 420 which uses Y toner, a C developing unit 430 which uses C toner, an M developing unit 440 which uses M toner, and a revolver drive unit. The developing units 410, 420, 430, and 440 as constituents of the revolver developing unit 400 respectively comprise developing sleeves 411, 421, 431, and 441 as developer carrier members, the developing sleeves 411, 421, 431, and 441 being adapted to rotate while allowing the crest of a developer to be in contact with the surface of the photoreceptor drum 200 for developing electrostatic latent images on the photoreceptor drum, developer paddles 412, 422, 432, and 442 adapted to rotate for scooping up and agitating the developer, and a sleeve drive section (not shown) for rotating the developing sleeves.

In this embodiment, toners contained in the developing units 410, 420, 430, and 440 are fed from toner bottles 413, 423, 433, and 443, respectively, and are charged in negative polarity by agitation together with a ferrite carrier. To the developing sleeves 411, 421, 431, and 441 in the developing units is applied a developing bias from a power supply serving as a developing bias application means (not shown), the developing bias comprising an AC voltage (AC component) superposed on a negative DC voltage (DC component). As a result, a predetermined developing bias is applied between each developing sleeve and a metallic base layer formed on the photoreceptor drum 200.

When the copying machine 1 is in a stand-by state, as shown in FIG. 4, the revolver developing unit 400 causes the Bk developing unit 410 to stop at a home position with respect to a developing position. The home position in this embodiment is set at a 22.5°-revolved position of the developing sleeve 411 in the Bk developing unit 410 on an upstream side in a revolving direction indicated with arrow D in the figure with respect to a developing position opposed to the photoreceptor drum 200.

The intermediate transfer unit 500 comprises an intermediate transfer belt 501 as an intermediate transfer member and plural rollers 507 to 512 on which is stretched the intermediate transfer belt 501. Around and in opposition to the intermediate transfer belt 501 are arranged the second transfer unit 600, a belt cleaning blade 504 as an intermediate transfer member cleaning means, a lubricant application brush 505 as a lubricant application means, and an optical sensor 514 as a mark sensor for detecting a position detecting mark put on the back of a non-image forming area of the intermediate transfer belt. The intermediate transfer belt 501 is entrained on a primary transfer bias roller 507 as a primary transfer means, a belt drive roller 508 as a belt drive means, a belt tension roller 509, a secondary transfer opposition roller 510, a cleaning opposition roller 511, and an earth roller 512. These rollers are formed using an electrically conductive material and the other rollers than the primary transfer bias roller 507 are connected to ground. A primary transfer power supply 801, which is constant current- or voltage-controlled, is connected to the primary transfer bias roller 507. By means of a control section as a control means which will be described later, the primary transfer bias roller 507 is controlled to a current or voltage of a predetermined magnitude according to the number of overlaps of toner images and is applied with a primary transfer bias at a predetermined application timing.

The intermediate transfer belt 501 is driven in the direction of arrow B in FIG. 3 by the belt drive roller 508 which is rotated with a drive motor (not shown). The intermediate transfer belt 501 has a single or multi-layer structure formed of a semiconductor or an insulator. Its surface resistance value is set at $10^{12}$ Ω/cm2 or so, whereby it is possible to prevent sneaking of a primary transfer electric field at the time of primary transfer and hence possible to suppress the occurrence of lap dirt.

In the primary transfer section where toner images of various colors formed on the photoreceptor drum 200 are transferred onto the intermediate transfer belt 501, the intermediate transfer belt is pushed against the photoreceptor drum by means of the primary transfer bias roller 507 and the earth roller 512. As a result, in the primary transfer section, a nip portion of a predetermined width is formed between the photoreceptor drum 200 and the intermediate transfer belt 501.

The lubricant application brush 505 is for applying fine particles to the intermediate transfer belt 501 which fine particles are obtained by scraping off a plate-like zinc stearate as lubricant. The lubricant application brush 505 is constituted so as to be movable into contact with the intermediate transfer belt 501 at a predetermined timing and away from the belt.

The secondary transfer unit 600 comprises a secondary transfer belt 601, three support rollers 602, 603, and 604 which support the secondary transfer belt 601 in a stretched state, and a secondary transfer bias roller 605. A stretched portion of the secondary transfer belt 601 positioned between the support rollers 602 and 603 can be put in pressure contact with the secondary transfer opposition roller 510 through the intermediate transfer belt 501. One of the three support rollers 602, 603, and 604 is a drive roller which is rotated by a drive means (not shown), and with this drive roller, the secondary transfer belt 601 is moved in the direction of arrow C in the figure.

The secondary transfer bias roller 605 is disposed in such a manner that the intermediate transfer belt 501 and the secondary transfer belt 601 are sandwiched in between the secondary transfer bias roller and the secondary transfer opposition roller 510 in the intermediate transfer unit 500. A transfer bias of a predetermined current is applied to the secondary transfer bias roller 605 by means of a secondary transfer power supply 802 which is constant current-controlled. In the secondary transfer unit 600, the support roller 602 and the secondary transfer bias roller 605 are each provided with a not-shown engaging/disengaging mechanism so that the secondary transfer belt 601 and the secondary transfer bias roller 605 can move into contact with and away from the secondary transfer opposition roller 510. A dash-double dot line in FIG. 3 represents a spaced position of the secondary transfer belt 601 and the support roller 602.

With a pair of resist rollers 650, transfer paper P as a transfer medium is fed at a predetermined timing to a secondary transfer section formed between the intermediate transfer belt 501 and the secondary transfer belt 601 which are sandwiched in between the secondary transfer bias roller 605 and the secondary transfer opposition roller 510. At a portion of the secondary transfer belt 601 at which the secondary transfer belt is entrained on the support roller 603 located on the fixing unit 700 side, a transfer paper destaticizing charger 606 as a transfer medium destaticizing means and a belt destaticizing charger 607 as a transfer medium support member destaticizing means are opposed to each other. Further, a cleaning blade 608 as a transfer medium support member cleaning means is in abutment against a portion of the secondary transfer belt 601 which portion is entrained on the support roller 604.

The transfer paper destaticizing charger 606 destaticizes ah electric charge held on the transfer paper P, thereby permitting the transfer paper to be separated in a satisfactory manner from the secondary transfer belt 601 by virtue of a high stiffness of the transfer paper itself. The belt destaticizing charger 607 destaticizes an electric charge remaining on the secondary transfer belt 601. The cleaning blade 608 functions to remove deposits on the surface of the secondary transfer belt 601 and thereby clean the said surface.

CONTROL EXAMPLE 1

Now, a description will be given below about one control example ("Control Example 1" hereinafter) of forming a full-color image with use of all the developing units 410, 420, 430, and 440. In this control example reference will be made to the case where an image is formed in the longitudinal direction of Japanese Industrial Standard A3-size paper.

Figure 1:
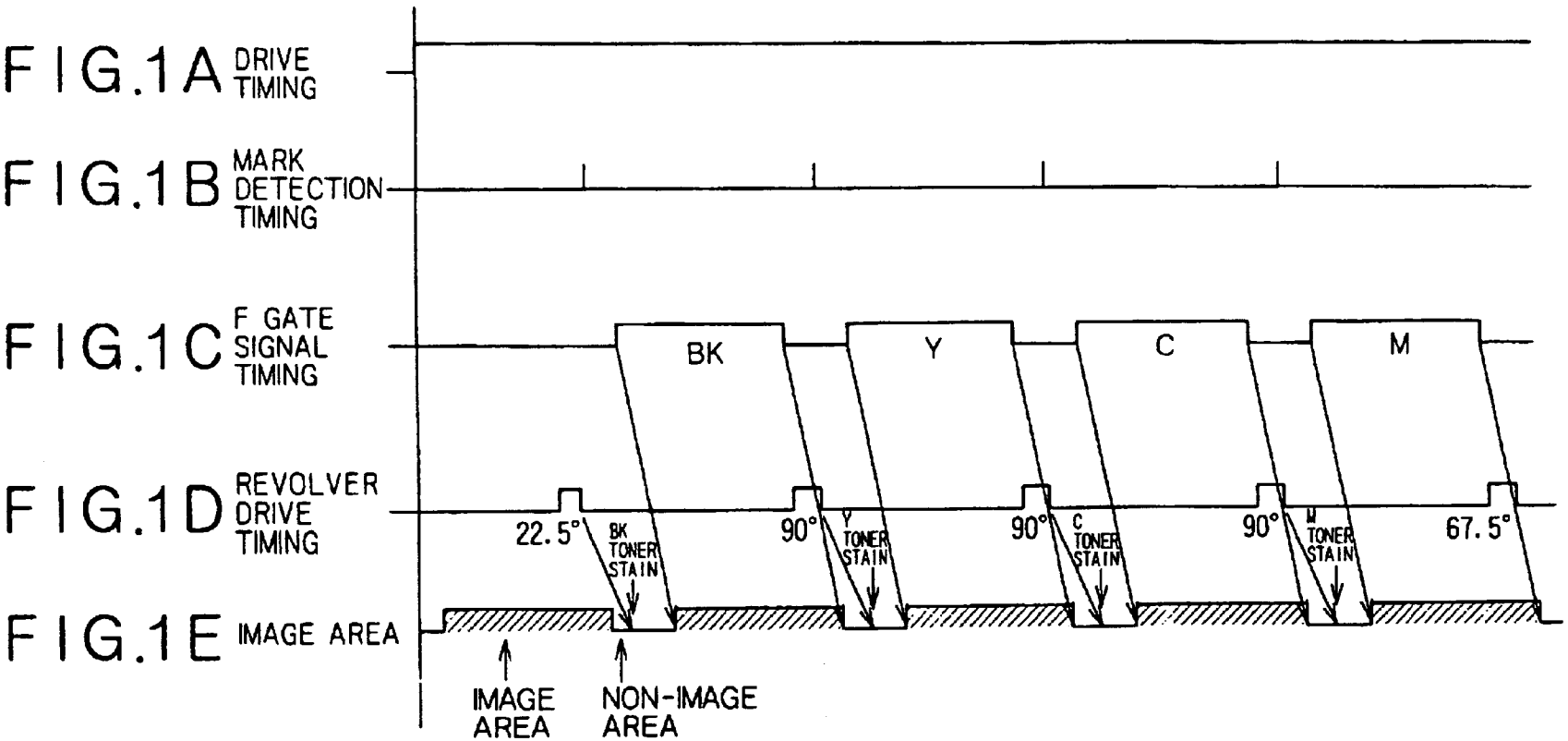
FIGS. 1(a) to 1(d) are timing charts showing a part of sequence control operations performed by a control section related to Control Example 1 in an embodiment of the present invention.
FIG. 1(e) is a timing chart showing at what timing a to-be-transferred area on an intermediate transfer belt passes a primary transfer section, in a corresponding relation to the timing charts of FIGS. 1(a) to 1(d)

FIGS. 1(a) to 1(d) are timing charts showing a part of sequence control operations performed by a control section as a control related to this control example and FIG. 1(e) is a timing chart showing at what timing a to-be-transferred area on the intermediate transfer belt 501 passes the primary transfer section.

When a user pushes a Copy Start key, the photoreceptor dram 200 starts rotating in the direction of arrow A in FIG. 3 with a drive motor (not shown) and the intermediate transfer belt 501 rotates in the direction of arrow B with the belt drive roller 508 (FIG. 1(a)). When the position detecting mark put on the intermediate transfer belt 501 is detected by the optical sensor 514 (FIG. 1(b)), an F gate signal is outputted slightly later than the mark detection timing (FIG. 1(c)). While the F gate signal is outputted, reading of image data from the original 5 is started and an optical write with laser beam L is performed on the basis of the image data. As a result, an electrostatic latent image of Bk is first formed on the photoreceptor drum 200.

In the revolver developing unit 400, before the Copy Start key is pushed, the Bk developing unit 410 assumes the home position which is a 22.5°-revolved position upstream in the revolving direction indicated with arrow D in FIG. 4 with respect to the developing position. In this case, if the revolver developing unit 400 is revolved 22.5°, causing the Bk developing unit 410 to move to the developing position, just after depression of the Copy Start key, then as shown in FIGS. 9(d) and 9(e), at the end of movement of the Bk developing unit, Bk toner stains in the Bk developing unit adheres to the surface of the photoreceptor drum 200 which comes into contact with the to-be-transferred area on the intermediate transfer belt 501. In the first transfer section this Bk toner stain adheres to the to-be-transferred area on the intermediate transfer belt 501 and causes deterioration of the image quality.

In view of this point, in this control example, after the Copy Start key is pushed and after the area on the photoreceptor drum 200 which comes into contact with the to-be-transferred area on the intermediate transfer belt 501 passes the developing position, the revolver developing unit 400 is revolved, causing the Bk developing unit 410 to move to the developing position (FIG. 1(d)). Consequently, as shown in FIG. 1(e), the Bk toner stain adheres to a not-to-be-transferred area on the intermediate transfer belt 501, with no influence exerted on the image quality.

The Bk developing unit 410 which has thus moved to the developing position develops the electrostatic latent image of Bk arriving at the developing position, whereby the Bk toner image formed on the photoreceptor drum 200 is primarily transferred to the to-be-transferred area on the intermediate transfer belt. Thereafter, the Y developing unit 420 which is to effect development next also moves so that the surface of the photoreceptor drum 200 for contact therewith upon arrival at the developing position comes into contact with a not-to-be-transferred area on the intermediate transfer belt 501. Then, Y toner image formed on the photoreceptor drum 200 by the Y developing unit 420 is primarily transferred so as to overlap the Bk toner image on the intermediate transfer belt 501. This is also true of the subsequent C and M.

The toner images thus formed in an overlapped state of four colors on the intermediate transfer belt 501 are then transferred together onto transfer paper P in the secondary transfer section. The transfer paper P is fed to the secondary transfer section by the paired resist rollers 650 when the front end of toner image on the intermediate transfer belt 501 comes to the second transfer section. At the beginning of the image forming operation the transfer paper P is already fed to the paired resist rollers 650 from a transfer paper cassette 6 in the paper feed cassette section 4 or from a manual paper feed tray 7. When the transfer paper P passes the secondary transfer section in an overlapped state with the toner images on the intermediate transfer belt 501, the toner images are together transferred onto the transfer paper P with a secondary transfer bias applied to the secondary bias roller 605.

With movement of the secondary transfer belt 601, the transfer paper P with toner images thus transferred thereto is conveyed, and when passing the portion opposed to the transfer paper destaticizing charger 606, the transfer paper is destaticized and leaves the secondary transfer belt. Then, the toner images are melt-fixed in the nip portion of the paired fixing rollers 701 and the transfer paper P is discharged to the exterior of the copying machine by means of a pair of discharge rollers 8.

After the above primary transfer, the photoreceptor drum 200 is destaticized uniformly by means of a destaticizer 202 and thereafter residual toner remaining on the surface of the photoreceptor drum is subjected to cleaning by the photo receptor cleaner 210. Likewise, residual toner which is left unused on the surface of the intermediate transfer belt 501 after the secondary transfer is subjected to cleaning by the belt cleaning belt 504 which is pushed against the intermediate transfer belt 501 by an engaging/disengaging mechanism (not shown).

CONTROL EXAMPLE 2

The following description is now provided about a control example ("Control Example 2" hereinafter) wherein image formation is performed using only Y developing unit 420, C developing unit 430, and M developing unit 440 without using Bk developing unit 410. Also in this control example, as in the above Control Example 1, an example will be given in which image formation is performed in the longitudinal direction of Japanese Industrial Standard A3-size paper.

Figures 5A, 5B, 5C, 5D, 5E:
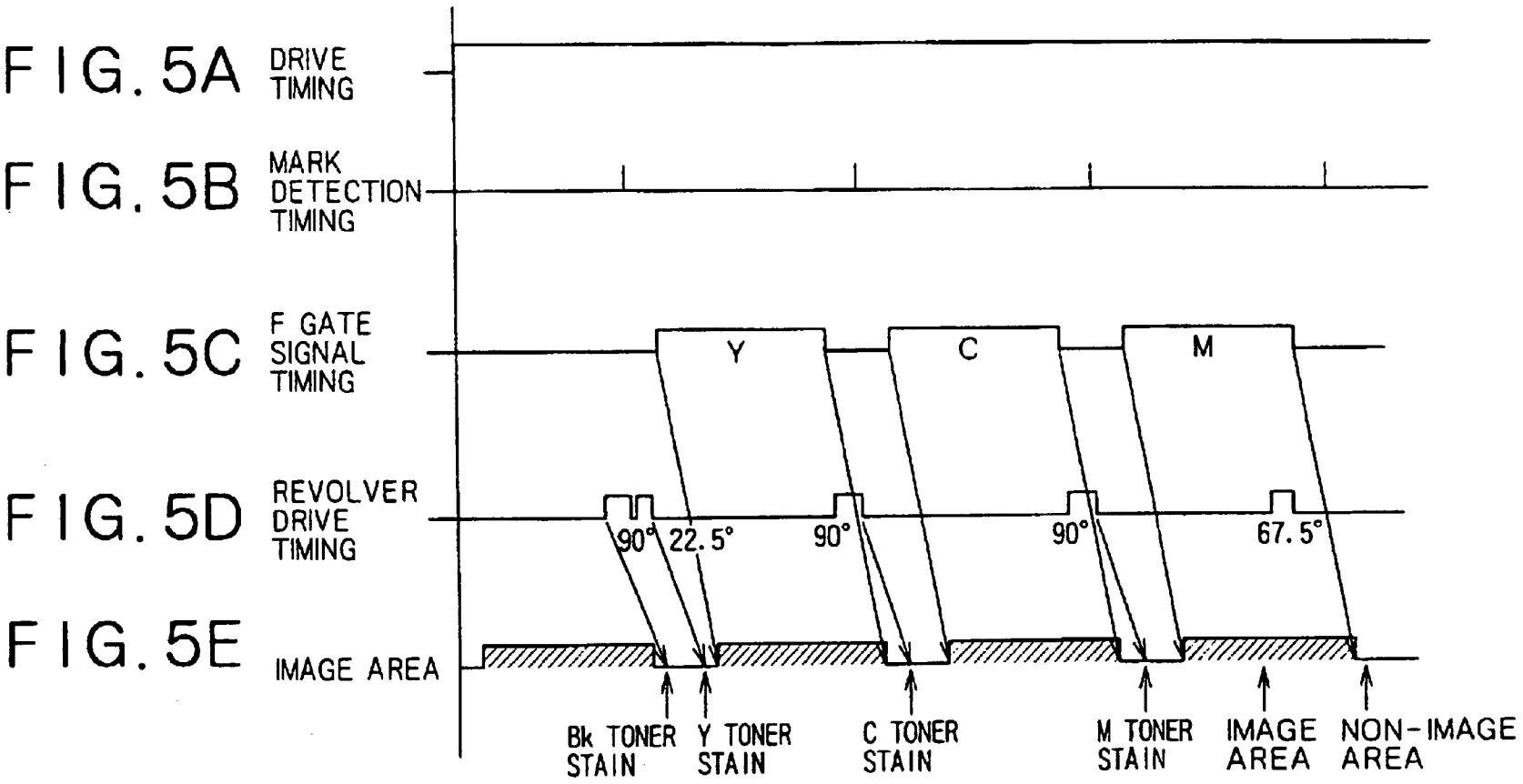
FIGS. 5(a) to 5(d) are timing charts showing a part of sequence control operations performed by a control section related to Control Example 2 in the embodiment.
FIG. 5(e) is a timing chart showing at what timing the to-be-transferred area on the intermediate transfer belt passes the primary transfer section, in a corresponding relation to the timing charts of FIGS. 5(a) to 5(d)

FIGS. 5(a) to 5(d) are timing charts showing a part of sequence control operations performed by a control section as a control means related to this control example and FIG. 5(e) is a timing chart showing at what timing the to-be-transferred area on the intermediate transfer belt 501 passes the primary transfer section.

When the user pushes the Copy Start key, as in the previous Control Example 1, the photoreceptor drum 200 and the intermediate transfer belt 501 start rotating (FIG. 5(a)) and the position detecting mark on the intermediate transfer belt is detected by the optical sensor 514 FIG. 5(b)), then an F gate signal is outputted slightly later than the mark detection timing (FIG. 5(c)). First, an electrostatic latent image of Y is formed on the photoreceptor drum 200.

After depression of the Copy Start key and before the front end portion of the electrostatic latent image of Y arrives at the developing position, the revolver developing unit 400 which has stood by at the home position revolves 90° to let the Y developing unit 420 stand by at a development stand-by position which is a 22.5°-revolved position upstream in the revolving direction indicated with arrow D in FIG. 4 with respect to the developing position. Upon this 22.5° revolution the developer contained in the Bk developing unit 410 comes into contact with the upper surface of the photoreceptor drum 200 in the developing position. Therefore, if the revolver developing unit 400 is revolved 90° just after depression of the Copy Start key, Bk toner stain caused by the aforesaid contact adheres to the to-be-transferred area on the intermediate transfer belt 501 as in the example illustrated in FIG. 9.

In this control example, the revolver developing unit 400 is revolved 90° after depression of the Copy Start key and after the area on the photoreceptor drum 200 which contacts the to-be-transferred area on the intermediate transfer belt 501 passes the developing position. Consequently, as shown in FIG. 5(e), Bk toner stain, when passing the developing position, adheres to a not-to-be-transferred area on the intermediate transfer belt 501, exerting no influence on the image quality.

When the 90° revolution is thus completed, the Y developing unit 420 assumes the development stand-by position which is a 22.5° revolved position upstream in the revolving direction from the developing position. Simultaneously with the arrival timing of the electrostatic latent image of Y at the developing position the revolver developing unit 400 is revolved 22.5°, causing the Y developing unit 420 to move to the developing position. Thus, by once allowing the Y developing unit 420 to stand by at the development stand-by position, it is possible to diminish the time of contact with the photoreceptor drum 200 and hence possible to prevent a waste consumption of toner adhered onto the photoreceptor drum when the electrostatic latent image of Y is not developed.

CONTROL EXAMPLE 3

Next, a description will be given about a control example ("Control Example 3" hereinafter) wherein image formation is performed using only Bk developing unit 410 and M developing unit 440 without using Y developing unit 420 and C developing unit 430. In this control example, an example will be given in which image formation is performed in the longitudinal direction of Japanese Industrial Standard A3-size paper.

Figures 6A, 6B, 6C, 6D, 6E:
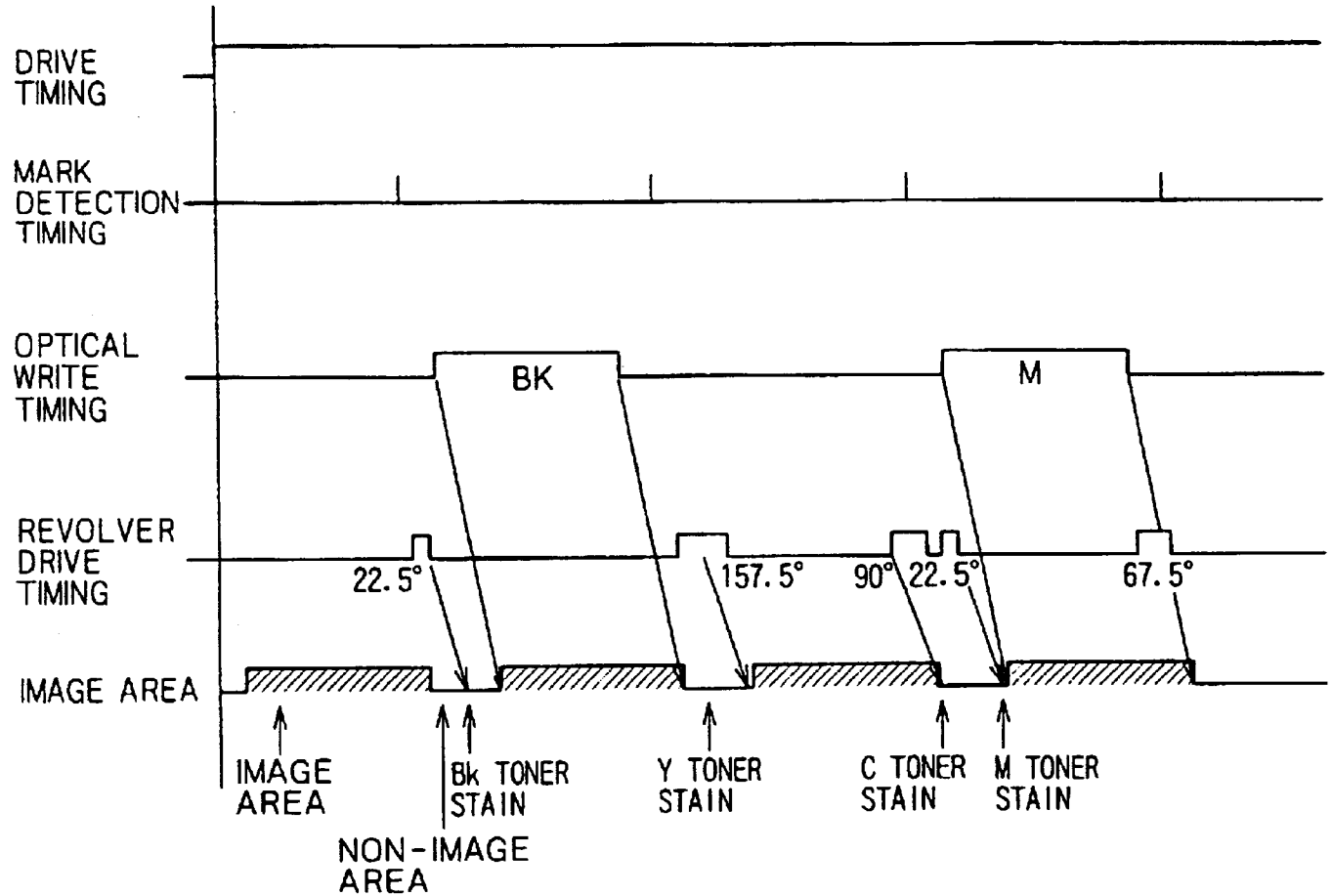
FIGS. 6(a) to 6(d) are timing charts showing a part of sequence control operations performed by a control section related to Control Example 3 in the embodiment.
FIG. 6(e) is a timing chart showing at what timing the to-be-transferred area on the intermediate transfer belt passes the primary transfer section, in a corresponding relation to the timing charts of FIGS. 6(a) to 6(d)

FIGS. 6(a) to 6(d) are timing charts showing a part of sequence control operations performed by a control section as a control means related to this control example and FIG. 6(e) is a timing chart showing at what timing the to-be-transferred area on the intermediate transfer belt 501 passes the primary transfer section.

When the user pushes the Copy Start key, as in the foregoing Control Example 1, the photoreceptor drum 200 and the intermediate transfer belt 501 start rotating (FIG. 6(a)) and the position detecting mark on the intermediate transfer belt is detected by the optical sensor 514 (FIG. 6(b)), then an F gate signal is outputted slightly later than the mark detection timing (FIG. 6(c)). First an electrostatic latent image of Bk is formed on the photoreceptor drum 200.

The revolver developing unit 400 which has stood by at the home position revolves 22.5° at the same timing as in Control Example 1, causing the Bk developing unit 410 to move to the developing position (FIG. 6(d)). The electrostatic latent image of Bk formed on the photoreceptor drum 200 is developed by the Bk developing unit 410 and the resulting toner image is primarily transferred onto the intermediate transfer belt 501 in the primary transfer section.

After the primary transfer of the Bk toner image it is necessary that the revolver developing unit 400 be revolved 247.5° to let the M developing unit 440 for the next development move to the development stand-by position. In this case, however, if the revolver developing unit 400 is revolved 247.5° at a time, C toner stain will adhere to the to-be-transferred area on the intermediate transfer belt 501 in relation to the revolving speed of the revolver developing unit although Y toner stain does not adhere to the to-be-transferred area on the intermediate transfer belt 501.

In this control example, therefore, the revolution of the revolver developing unit 400 for moving the M developing unit 440 to the development stand-by position is performed in two stages as shown in FIG. 6(d). More specifically, after the development by the Bk developing unit 410 is over, the revolver developing unit 400 is revolved only 157.5°, causing the Y developing unit 420 to once pass the developing position and the C developing unit 430 to stand by at the development stand-by position. With this revolution, Y toner stain deposited on the photoreceptor drum 200 adheres to a not-to-be-transferred area on the intermediate transfer belt 501 (FIG. 6(e)). Then, at a timing of a little less than one-round-rotation of the intermediate transfer belt 501 after the start of the above revolution, the revolver developing unit 400 is again revolved 90°. To be more specific, the revolver developing unit 400 is revolved 90° at a timing of (565.5 [mm]–40 [mm]/156 [mm/sec]) elapsed from the start of revolution which is for moving the C developing unit 430 to the development stand-by position.

In case of merely starting the next 90° revolution at a timing of one-round-rotation of the intermediate transfer belt after the start of the 157.5° revolution, the revolution may be started at a timing determined by dividing the circumferential length (565.5 mm) of the intermediate transfer belt 501 by a surface moving speed (156 mm/sec) of the intermediate transfer belt. In this connection, although Y toner stain adheres onto the photoreceptor drum 200 upon 90° revolution after the start of the 157.5° revolution, C toner stain adheres onto the photoreceptor drum 200 upon 22.5° revolution after the start of the 90° revolution. Therefore, for allowing C toner stain to adhere to the same position on the intermediate transfer belt 501 as that of Y toner stain, it is necessary to correct an error of the time from the revolution start until the deposition of tone stain on the photoreceptor drum 200. For correcting this error, that is, for correcting the time required for 90° revolution of the revolver developing unit 400, i.e., 320 msec×156 mm/sec×(90°–22.5°)/90°, the revolution is started about 40 [mm]/156 [mm/sec] earlier than the time required for one-round rotation of the intermediate transfer belt 501.

By thus performing the revolution in two stages, C toner stain adheres to almost the same position as the Y toner stain-adhered position on the intermediate transfer belt 501. That is, C toner stain adheres to a not-to-be-transferred area on the intermediate transfer belt 501. In synchronism with the arrival timing of the electrostatic latent image of M at the developing position the revolver developing unit 400 revolves 22.5°, causing the M developing unit 420 to move to the developing position to develop the electrostatic latent image of M. In this control example, at the initial mark detection timing after turning OFF of the F gate signal of Bk there is not performed an optical write for forming an electrostatic latent image of M, but in synchronism with the next mark detection timing there is performed an optical write of an electrostatic latent image of M.

CONTROL EXAMPLE 4

Next, in connection with performing image formation by using only Bk developing unit 410 and M developing unit 440 as in the above Control Example 3, a control example ("Control Example 4" hereinafter) will be given below in which an image in the transverse direction of Japanese Industrial Standard A4-size paper is formed by double-sheet image formation onto the intermediate transfer belt 501.

Figures 7A, 7B, 7C, 7D, 7E:
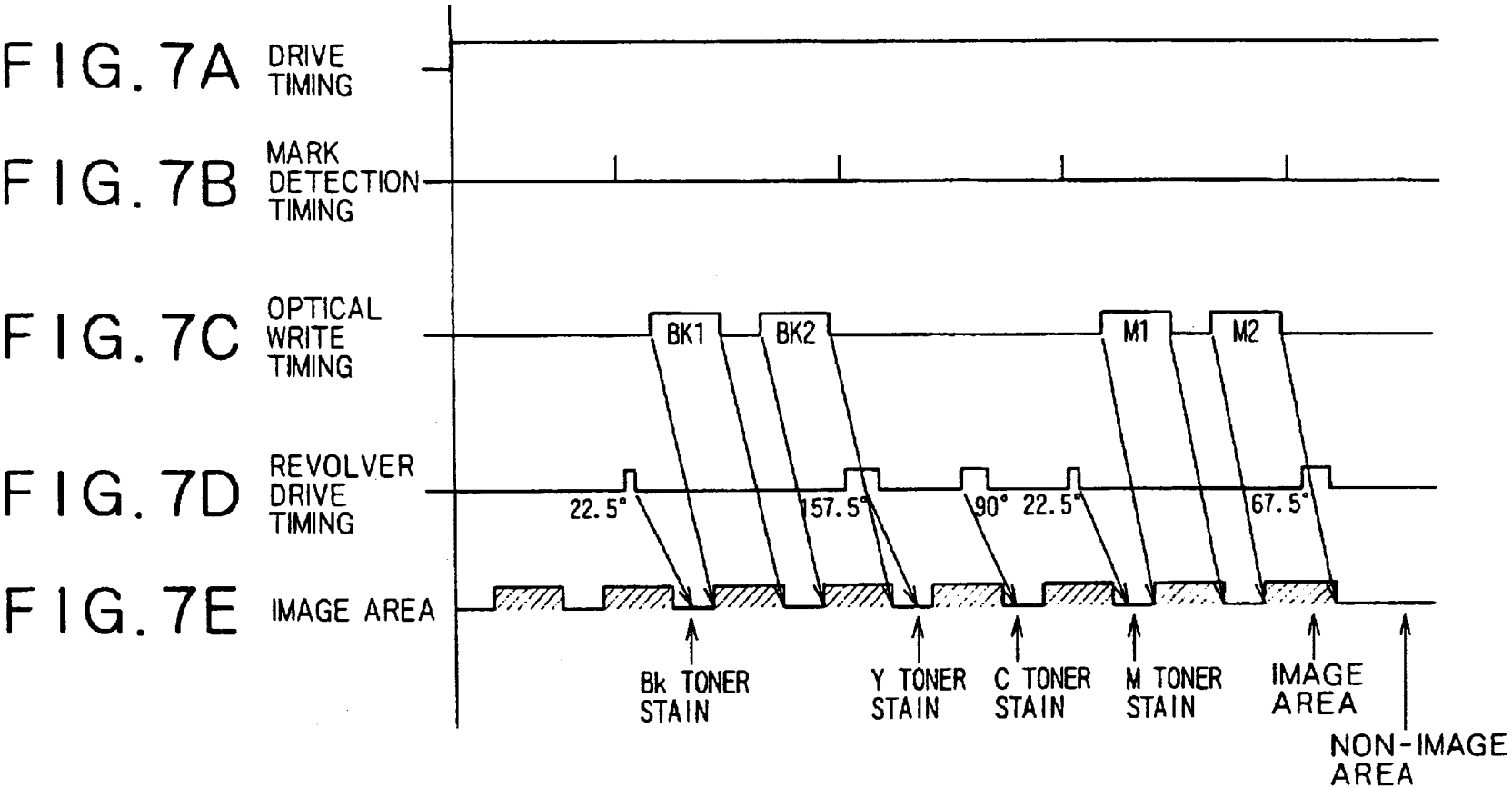
FIGS. 7(a) to 7(d) are timing charts showing a part of sequence control operations performed by a control section related to Control Example 4 in the embodiment.
FIG. 7(e) is a timing chart showing at what timing the to-be-transferred area on the intermediate transfer belt passes the primary transfer section, in a corresponding relation to the timing charts of FIGS. 7(a) to 7(d)

FIGS. 7(a) to 7(d) are timing charts showing a part of sequence control operations performed by a control section as a control means related to this control example and FIG. 7(e) is a timing chart showing at what timing the to-be-transferred area on the intermediate transfer belt 501 passes the primary transfer section.

In this control example, the revolver developing unit 400 which has stood by at the home position revolves 22.5° at the same timing as in the foregoing Control Example 1, causing the Bk developer 410 to move to the developing position (FIG. 7(d)). An electrostatic latent image of Bk formed on the photoreceptor drum 200 is developed by the Bk developing unit 410 and the resulting toner image is primarily transferred onto the intermediate transfer belt 501 in the primary transfer section.

After the primary transfer of the Bk toner image it is necessary that the revolver developing unit 400 be revolved 247.5° to let the M developing unit 440 for the next development move to the development stand-by position. In this control example, however, since toner images for two images are formed at a time on the intermediate transfer belt 501, most of the belt surface becomes a to-be-transferred area; in other words, a not-to-be-transferred area becomes very narrow. Therefore, it is necessary to make some improvement for the control so as to prevent adhesion of color toner stains to the to-be-transferred area on the intermediate transfer belt 501.

In this control example, after the development by the Bk developing unit 410 is over, the revolver developing unit 400 is revolved by only 157.5°, causing only the Y developing unit 420 to once pass the developing position, while allowing the C developing unit 430 to stand by at the development stand-by position. With this revolution, Y toner stain adhered onto the photoreceptor drum 200 comes to adhere to a not-to-be-transferred area which lies behind the to-be-transferred area (toner image of Bk2) of the second sheet on the intermediate transfer belt 501 and before the to-be-transferred area (toner image of Bk1) of the first sheet (FIG. 7(e)). Then, the revolver developing unit 400 is revolved 90° at a timing of half-a-round rotation of the intermediate transfer belt 501, that is, upon lapse of (565.5 [mm]/2)/156 [mm/sec], after the start of the above 157.5° revolution. With this revolution, C toner stain adhered onto the photoreceptor drum 200 comes to adhere to a not-to-be-transferred area which lies behind the to-be-transferred area of the first sheet on the intermediate transfer belt 501 and before the to-be-transferred area of the second sheet (FIG. 7(e)).

When the M developing unit 440 has thus been allowed to stand by at the development stand-by position, the revolver developing unit 400 is then revolved 90° at a half-a-round rotation of the intermediate transfer belt 501, that is, upon lapse of (565.5 [mm]/2)/156 [mm/sec], after the start of the aforesaid 90° revolution. With this revolution, the M developing unit 440 moves to the developing position. M toner stain deposited at the end of movement of the M developing unit 440 adheres to a not-to-be-transferred area which lies behind the to-be-transferred area of the second sheet on the intermediate transfer belt 501 and before the to-be-transferred area of the first sheet FIG. 7(e)). The M developing unit 420 develops an electrostatic latent image of M arriving at the developing position. In this control example, an optical write for forming an electrostatic latent image of M is not performed at the first mark detection timing after turning OFF an F gate signal of Bk, but is performed at the next mark detection timing.

CONTROL EXAMPLE 5

In connection with the case where image formation is performed using only Bk developing unit 410 and M developing unit 440 as in the above Control Examples 3 and 4, a description will be given below about a control example ("Control Example 5" hereinafter) in which there is conducted image formation in the longitudinal direction of Japanese Industrial Standard A4-size paper.

Figures 8A, 8B, 8C, 8D, 8E:
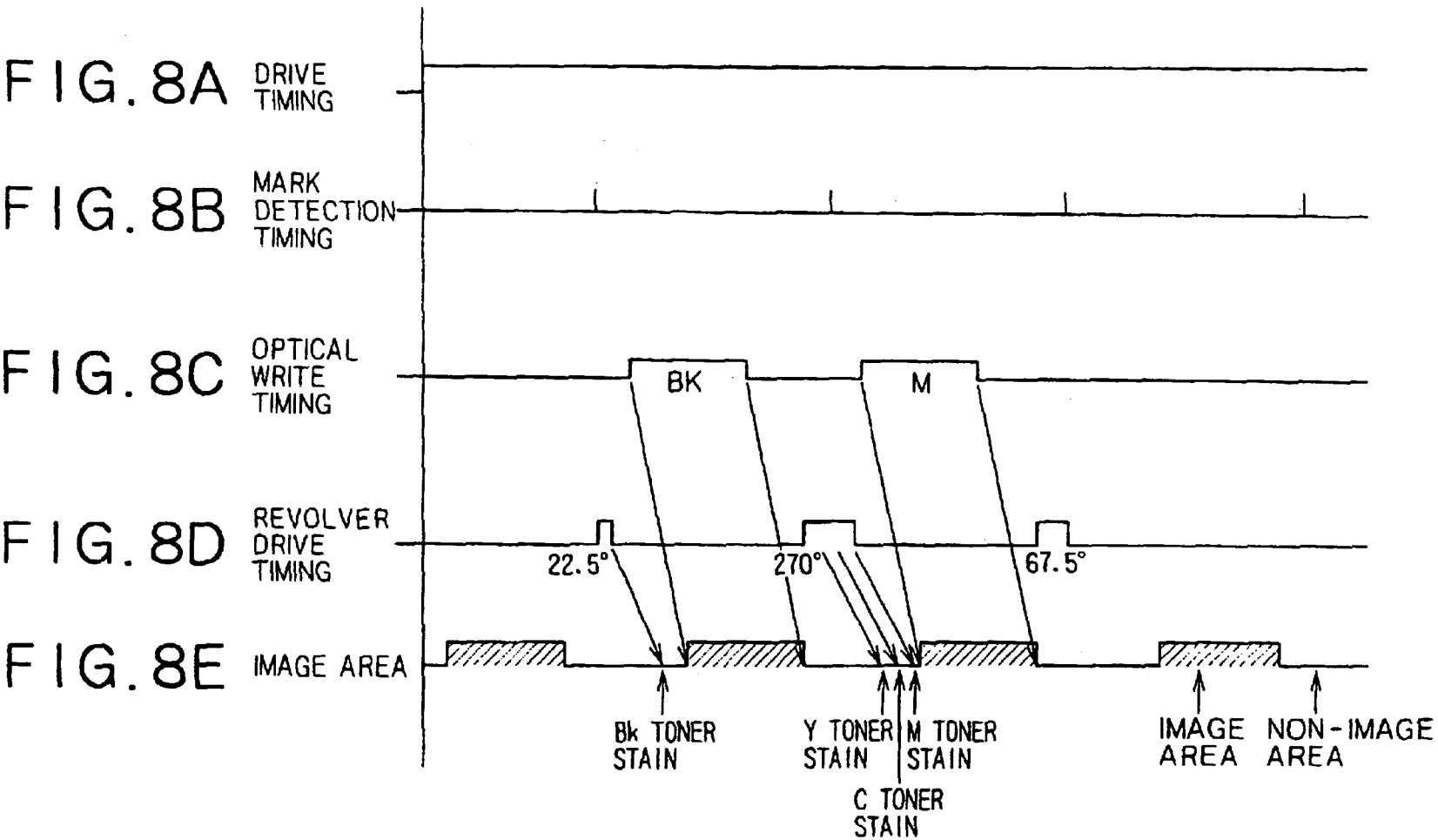
FIGS. 8(a) to 8(d) are timing charts showing a part of sequence control operations performed by a control section related to Control Example 5 in the embodiment.
FIG. 8(e) is a timing chart showing at what timing the to-be-transferred area on the intermediate transfer belt passes the primary transfer section.
Figures 10A, 10B, 10C, 10D, 10E:
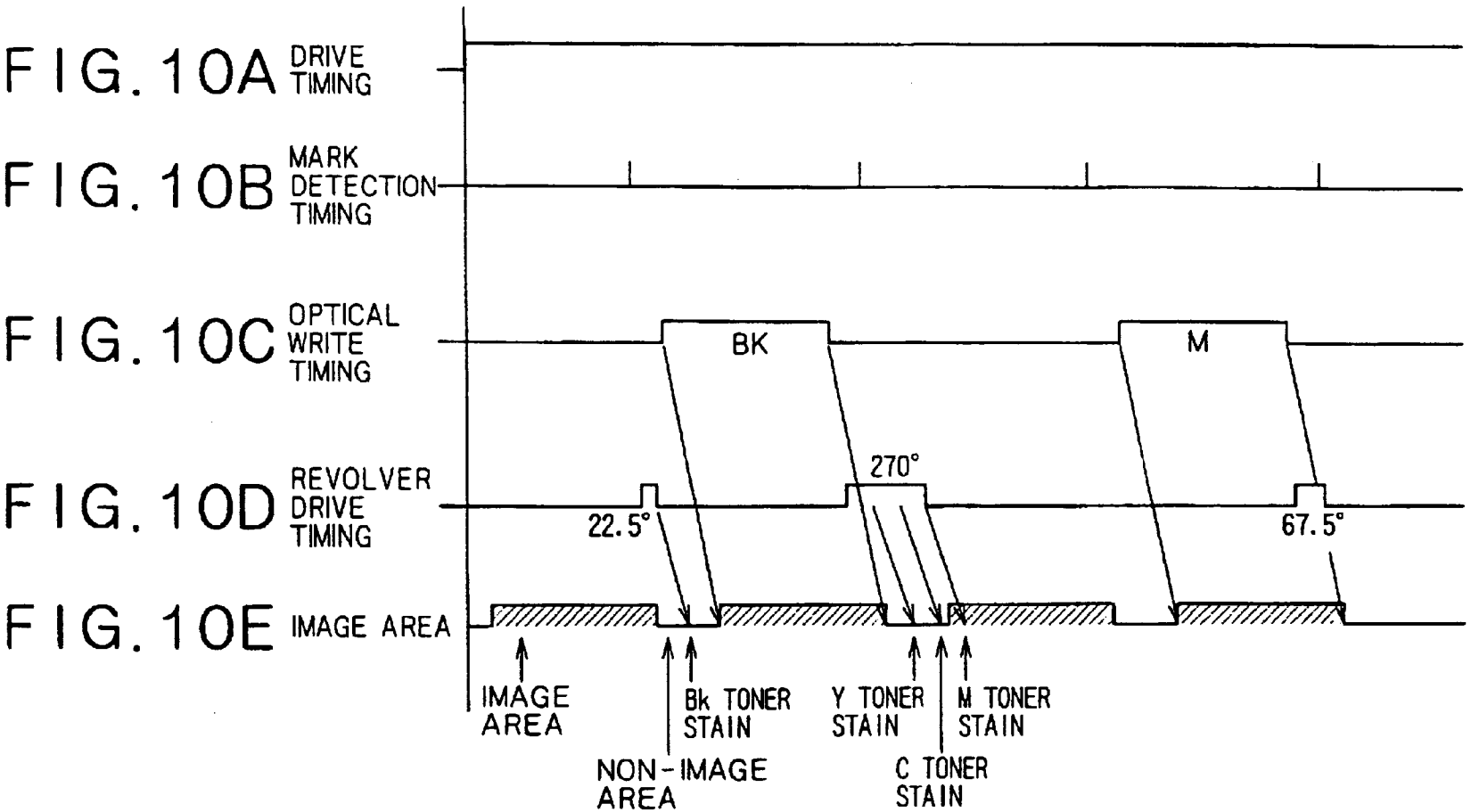
FIGS. 10(a) to 10(d) are timing charts showing a conventional control method adopted in case of toner stain adhering to the to-be-transferred area on the intermediate transfer belt.
FIG. 10(e) is a timing chart showing at what timing the to-be-transferred area on the intermediate transfer belt passes the primary transfer section, in a corresponding relation to the timing charts of FIGS. 10(a) to 10(d).

FIGS. 8(a) to 8(d) are timing charts showing a part of sequence control operations performed by a control section as a control means related to this embodiment and FIG. 8(e) is a timing chart showing at what timing the to-be-transferred area on the intermediate transfer belt 501 passes the primary transfer section.

In this control example, the revolver developing unit 400 which has stood by at the home position revolves 22.5° at the same timing as in the foregoing Control Example 1, causing the Bk developer 410 to move to the developing position (FIG. 8(d)). Then, an electrostatic latent image of Bk formed on the photoreceptor drum 200 is developed by the Bk developing unit 410 and the resulting toner image is primarily transferred onto the intermediate transfer belt 501 in the primary transfer section.

After the primary transfer of the Bk toner image it is necessary that the revolver developing unit 400 be revolved 270° to let the M developing unit 440 for the next development move to the developing position. In the process of forming an image in the longitudinal direction of A4-size paper, a not-to-be-transferred area on the intermediate transfer belt 501 is wider than that in the foregoing Control Examples 3 and 4. In this control example, therefore, after the development by the Bk developing unit 410 is over, the revolver developing unit 400 is revolved 270° at a time, causing the M developing unit 440 to move to the developing position at a time. Even if the not-to-be-transferred area is wide, there is not enough time for allowing the M developing unit 440 to once stand by at the development stand-by position. Therefore, without a temporary stop of the M developing unit 440 at the development stand-by position, there is made switching from the Bk developing unit 410 to the M developing unit 440.

The M developing unit 440 which has thus moved to the developing position develops an electrostatic latent image of M arriving at the developing position. In this control example there is enough time for switching to the M developing unit 440 at a time after the completion of development of an electrostatic latent image of Bk until arrival of the electrostatic latent image of M at the developing position, so that an optical write for forming an electrostatic latent image of M is performed at the first mark detection timing after turning OFF an F gate signal of Bk. Therefore, unlike the foregoing Control Examples 3 and 4, the intermediate transfer belt 501 which carries the Bk toner image is not required to idle-run before the primary transfer of M toner image. Thus, the time required for this image forming process is shorter than that in the foregoing Control Examples 3 and 4 and hence it is possible to enhance CPM (Copy Per Minutes).

The developing unit switching control methods for the revolver developing unit 400 described in the above control examples are stored in a predetermined storage medium provided in the copying machine 1. In accordance with image size and copy mode selected by the user, each of the above control sections which can function as a control method read means reads out an appropriate control method from the aforesaid storage medium and executes the selected control method.

Thus, in each of the above control examples reference has been made to an example of a developing unit switching control method for the revolver developing unit 400 with respect to different lengths of not-to-be-transferred areas on the intermediate transfer belt 501 and different types of developing units used. But no limitation is made thereto. Even for other image sizes and developing unit types than those referred to in the above control examples, there can be attained the same effects as above by selecting an appropriate developing unit switching control method for the revolver developing unit 400.

Although in this embodiment a description has been given of the revolver developing unit 400 having developing units of four colors Bk, Y, C, and M the present invention is also applicable to any other developing apparatus if only it has plural colors of developing units.

Although the revolver developing unit 400 adopted in this embodiment uses a two-component dry developer for development, the present invention is also applicable to a revolver developing unit using a wet developer for development. This is also true of a one-component developer. Moreover, the present invention is applicable not only to a revolver developing apparatus but also to a slide type developing apparatus.

As set forth above, according to the invention referred to in the foregoing first to sixth aspects it is possible to prevent toner stain deposited on an image bearing member from adhering to a to-be-transferred area on the intermediate transfer member and hence possible to prevent the deterioration of image quality. In addition to such an excellent effect there also can be attained an outstanding effect such that the period of time during which the developer contained in a developing unit contacts an image bearing member until actual development becomes shorter than that in case of toner stain being adhered to the to-be-transferred area, thus making it possible to suppress a wasteful consumption of toner.

Particularly, according to the invention defined in the foregoing third and fourth aspects there is attained an excellent effect such that even if the length of a not-to-be-transferred area in the surface movement direction of the intermediate transfer member changes depending on an image forming condition adopted in the image forming process concerned, it is possible to make switching to an appropriate control method.

Moreover, according to the invention referred to in the foregoing fifth and sixth aspects there is attained an excellent effect such that even in case of moving a developing unit concerned to the developing position while skipping over developing units not to be used in accordance with a copy mode selected by the user, it is possible to make switching to an appropriate control method.

Further, according to the invention referred to in the foregoing fourth and sixth aspects there is attained such an excellent effect as a control method switching operation can be done efficiently, because there are utilized control methods which are provided in advance.

What is claimed is:

1. An image forming system comprising:

an image bearing member;

an intermediate transfer member which is kept in contact with said image bearing member;

a developing apparatus having a plurality of developing units, said developing apparatus causing a developer contained in a predetermined one of said developing units into contact with said image bearing member to develop a latent image formed on the image bearing member;

a developing unit moving means capable of moving said predetermined developing unit to a developing position where the developer in the predetermined developing unit comes into contact with said image bearing member, latent images formed on said image bearing member being developed respectively by the developing units of said developing apparatus, toner images thus formed on the image bearing member being primarily transferred onto said intermediate transfer member in a primary transfer section in which the image bearing member and the intermediate transfer member are in contact with each other, and the toner images thus primarily transferred onto the intermediate transfer member being together transferred secondarily onto a transfer medium; and a control means which controls said developing unit moving means in such a manner that an area on said image bearing member at which the developer contained in said predetermined developing unit contacts said image bearing member to effect development, comes to contact a not-to-be-transferred area on said intermediate transfer member in said primary transfer section.

2. An image forming system comprising:

an image bearing member;

an intermediate transfer member which is kept in contact with said image bearing member;

a developing apparatus having a plurality of developing units, said developing apparatus causing a developer contained in a predetermined one of said developing units into contact with said image bearing member to develop a latent image formed on the image bearing member;

a developing unit moving means capable of moving said predetermined developing unit to a developing position where the developer in the predetermined developing unit comes into contact with said image bearing member, latent images formed on said image bearing member being developed respectively by the developing units of said developing apparatus, toner images thus formed on the image bearing member being primarily transferred onto said intermediate transfer member in a primary transfer section in which the image bearing member and the intermediate transfer member are in contact with each other, and the toner images thus primarily transferred onto the intermediate transfer member being together transferred secondarily onto a transfer medium; and a control means which, when moving said predetermined developing unit to effect development to said developing position so that any of the other developing units positioned on an upstream side in a developing unit moving direction of the developing position with respect to said predetermined developing unit passes the developing position, controls said developing unit moving means in such a manner that an area on said image bearing member at which a developer contained in said any of the other developing units contacts said image bearing member when said any of the other developing units passes the developing position, is an area on the image bearing member which area comes into contact with a not-to-be-transferred area on said intermediate transfer member in said primary transfer section.

3. An image forming system as claimed in claim 2, further comprising a control switching means which switches from one method to another for controlling said developing unit moving means in accordance with image forming conditions involving different lengths of said not-to-be-transferred area in a surface movement direction of said intermediate transfer member, and wherein said control means controls said developing unit moving means in accordance with the control method switched by said control switching means.

4. An image forming system as claimed in claim 3, wherein said control switching means has a storage medium which stores a plurality of control methods corresponding respectively to said image forming conditions and also has a control method read means for reading from said storage medium a control method corresponding to an image forming condition for an image forming process carried out by the image forming system.

5. An image forming system as claimed in claim 2, further comprising a control switching means for switching from one control method to another to control said developing unit moving means in accordance with a type of a developing unit used in an image forming process carried out by the image forming system, and wherein said control means controls said developing unit moving means in accordance with the control method switched by said control switching means.

6. An image forming system as claimed in claim 5, wherein said control switching means has a storage medium which stores a plurality of control methods corresponding respectively to the types of the developing units used in said image forming process and also has a control method read means for reading the control methods corresponding to the types of the developing units from said storage medium.

*7. An image forming system comprising:*

*an image bearing member;*

*an intermediate transfer member which is kept in contact with said image bearing member;*

*a developing apparatus having a plurality of developing units, said developing apparatus causing a developer contained in a predetermined one of said developing units to be supplied to said image bearing member to develop a latent image formed on the image bearing member;*

*a developing unit moving means capable of moving said predetermined developing unit to a developing position where the developer in the predetermined developing unit is supplied to said image bearing member,*

*latent images formed on said image bearing member being developed respectively by the developing units of said developing apparatus, toner images thus formed on the image bearing member being primarily transferred onto said intermediate transfer member in a primary transfer section in which the image bearing member and the intermediate transfer member are in contact with each other, and the toner images thus primarily transferred onto the intermediate transfer member being together transferred secondarily onto a transfer medium; and*

*a control means which controls said developing unit moving means in such a manner that an area on said image bearing member at which the developer contained in said predetermined developing unit is supplied to said image bearing member to effect development, comes to contact a not-to-be-transferred area on said intermediate transfer member in said primary transfer section.*

*8. An image forming system comprising:*

*an image bearing member;*

*an intermediate transfer member which is kept in contact with said image bearing member;*

*a developing apparatus having a plurality of developing units, said developing apparatus supplying a developer contained in a predetermined one of said developing units to said image bearing member to develop a latent image formed on the image bearing member;*

*a developing unit moving means capable of moving said predetermined developing unit to a developing position where the developer in the predetermined developing unit is supplied to said image bearing member,*

*latent images formed on said image bearing member being developed respectively by the developing units of said developing apparatus, toner images thus formed on the image bearing member being primarily transferred onto said intermediate transfer member in a primary transfer section in which the image bearing member and the intermediate transfer member are in contact with each other, and the toner images thus primarily transferred onto the intermediate transfer member being together transferred secondarily onto a transfer medium; and*

*a control means which, when moving said predetermined developing unit to effect development to said developing position so that any of the other developing units positioned on an upstream side in a developing unit moving direction of the developing position with respect to said predetermined developing unit passes the developing position, controls said developing unit moving means in such a manner that an area on said image bearing member at which a developer contained in said any of the other developing units is supplied to said image bearing member when said any of the other developing units passes the developing position, is an area on the image bearing member which area comes into contact with a not-to-be-transferred area on said intermediate transfer member in said primary transfer section.*

*9. An image forming system as claimed in claim 8, further comprising a control switching means which switches from one method to another for controlling said developing unit moving means in accordance with image forming conditions involving different lengths of said not-to-be-transferred area in a surface movement direction of said intermediate transfer member, and wherein said control means controls said developing unit moving means in accordance with the control method switched by said control switching means.*

*10. An image forming system as claimed in claim 9, wherein said control switching means has a storage medium which stores a plurality of control methods corresponding respectively to said image forming conditions and also has a control method read means for reading from said storage medium a control method corresponding to an image forming condition for an image forming process carried out by the image forming system.*

*11. An image forming system as claimed in claim 8, further comprising a control switching means for switching from one control method to another to control said developing unit moving means in accordance with a type of a developing unit used in an image forming process carried out by the image forming system, and wherein said control means controls said developing unit moving means in accordance with the control method switched by said control switching means.*

*12. An image forming system as claimed in claim 11, wherein said control switching means has a storage medium which stores a plurality of control methods corresponding respectively to the types of the developing units used in said image forming process and also has a control method read means for reading the control methods corresponding to the types of the developing units from said storage medium.*

* * * * *